United States Patent [19]

Shimizu et al.

[11] Patent Number: 5,439,564
[45] Date of Patent: Aug. 8, 1995

[54] METHOD OF PROCESSING ORGANIC QUATERNARY AMMONIUM HYDROXIDE-CONTAINING WASTE LIQUID

[75] Inventors: Shumpei Shimizu; Toshitsura Cho, both of Tokyo; Shigeo Iiri, Kawasaki, all of Japan

[73] Assignee: Tama Chemicals Co. Ltd., Tokyo, Japan

[21] Appl. No.: 149,827

[22] Filed: Nov. 10, 1993

[30] Foreign Application Priority Data

Nov. 10, 1992 [JP] Japan .................................. 4-323814
Nov. 26, 1992 [JP] Japan .................................. 4-337835

[51] Int. Cl.⁶ ............................................. B01D 61/42
[52] U.S. Cl. ............................. 204/102; 204/182.4; 210/681
[58] Field of Search ......................... 204/102, 182.4; 210/681

[56] References Cited

U.S. PATENT DOCUMENTS

| | | | |
|---|---|---|---|
| 4,568,466 | 2/1986 | Salem et al. | 210/663 |
| 4,917,781 | 4/1990 | Sharifian et al. | 204/72 |
| 4,968,433 | 11/1990 | Schmidt et al. | 210/679 |

FOREIGN PATENT DOCUMENTS

60-247641 12/1985 Japan .................................. 204/182.4

OTHER PUBLICATIONS

The British Drug Houses Ltd., "Ion Exchange Resins" pp. 1-36. [no date].

*Primary Examiner*—John Niebling
*Assistant Examiner*—Arun S. Phasge
*Attorney, Agent, or Firm*—Nikaido, Marmelstein, Murray & Oram

[57] ABSTRACT

The invention is a method of processing a waste liquid containing at least an organic quaternary ammonium hydroxide. The waste liquid is brought into contact with a cation-exchanging material so as to make the organic quaternary ammonium ions adsorbed by the material to thereby remove the ions from the liquid (adsorbing step), and optionally the cation-exchanged water obtained by the contact is again processed to separate and remove resist peelings and surfactants therefrom. The invention is also a method of processing the organic quaternary ammonium hydroxide-containing waste liquid for recovering a valuable substance of the organic quaternary ammonium hydroxide therefrom. The method comprises the adsorbing step and an eluting step of bringing an eluent into contact with the cation-exchanging material that has adsorbed the organic quaternary ammonium ions so as to elute the ions from the material followed by an electrolyzing step of electrolyzing the eluate obtained in the eluting step to recover an aqueous solution of the organic quaternary ammonium hydroxide. The anodic liquid drawn from the electrolytic cell in the electrolyzing step may be re-circulated to the eluting step to be used as an eluent therein.

By the invention, an organic quaternary ammonium hydroxide-containing waste liquid may be processed efficiently and inexpensively to give a low-COD, clean processed water, which may be directly discharged into rivers and others. If desired, the valuable substance of the organic quaternary ammonium hydroxide may be recovered efficiently and inexpensively at a high purity level.

5 Claims, No Drawings

METHOD OF PROCESSING ORGANIC QUATERNARY AMMONIUM HYDROXIDE-CONTAINING WASTE LIQUID

FIELD OF THE INVENTION AND RELATED ART STATEMENT

The present invention relates to a method of processing an organic quaternary ammonium hydroxide-containing waste liquid and, more precisely, to a method of processing an organic quaternary ammonium hydroxide-containing waste liquid that is essentially discharged from the developing step in the process of producing semiconductors or the like, for effectively and inexpensively removing the organic quaternary ammonium hydroxides from the waste liquid or recovering them as valuable materials, Recently, a demand for semiconductor devices, printed circuit boards, liquid crystal display devices and the like is increasing with the development of electric and electronic technology. Accordingly, the amount of aqueous alkaline solutions used as developers in the developing step in the manufacturing process of semiconductor devices and cleaning agents in the step of cleaning Si wafers and glass substrates of liquid crystals is increasing. As a result the amount of the waste liquids to be discharged from the developing step and cleaning step is also increasing greatly. Further increase in the integration of semiconductor devices and minimization of the patterns in printed circuit boards and liquid crystal display devices have necessitated the use of aqueous alkaline solutions having higher purity level. In order to satisfy this requirement, aqueous solutions of organic quaternary ammonium hydroxides such as tetramethylammonium hydroxide (TMAH) and β-hydroxyethyl-trimethylammonium hydroxide (choline) have come to common use.

The waste liquids from the processes of producing such semiconductor devices, printed circuits, liquid crystal display devices and others contain organic quaternary ammonium hydroxides derived from the developers and washing liquids generally in an amount of from 100 to 20,000 ppm or so. In particular, the developers contain resist peelings derived from various photo-sensitive resins, such as mixtures or condensates of quinonediazides and phenol-novolak resins used as resists (photolyzable resists), generally in an amount of from 10 to 10,000 ppm or so. Such organic quaternary ammonium hydroxides and resist peelings are the essential COD-causing substances in the waste liquids.

In order to process the waste liquids, it is necessary to remove the COD-causing substances of organic quaternary ammonium hydroxides and resist peelings as much as possible. For this purpose, heretofore, a method of neutralizing the substances followed by subjecting them to biodegradation prior to discharging the waste liquids to rivers and others or a method of firing the substances has been employed. Accordingly, useful substances such as TMAH and choline as contained in the waste liquids have been discarded by the processing of the waste liquids up to these days.

However, the method of discharging the waste liquids after the biodegradation of the COD-causing substances needs a large-scale equipment for the activated sludge process and needs much money for processing the waste liquids. The activated sludge process is relatively effective for processing natural-derived organic quaternary ammonium hydroxides such as an aqueous choline solution, but it cannot apply to non-natural substances such as TMAH and others. Even if possible, the efficiency of the process is extremely low in many cases. Therefore, the process was problematic in the economical aspect and the effectiveness.

On the other hand, incineration method requires a large equipment if the waste liquids are directly burned in a an incinerator. In addition, the burning cost is quite high. Therefore, the waste liquids must be concentrated prior to the incineration. However, there is not known a method of concentrating them at low costs. Also when the waste liquids are burned, they generate harmful NOx. Therefore, an additional equipment for removing the generated NOx is needed. Thus, the method involved various problems.

In order to overcome the problems, Japanese Patent Laid-Open No. 60-118282 has proposed a method of introducing a TMAH-containing waste liquid into a reversed osmotic membrane device under pressure at pH of from 9 to 12 so as to concentrate the liquid followed by discharging the processed water having a low TMAH concentration or containing substantially no TMAH into rivers and others; and Japanese Patent Laid-Open No. 60-247641 has proposed a method of concentrating a waste liquid containing quaternary ammonium ions derived from TMAH and others by reversed osmotic permeation followed by electrolyzing the resulting concentrated liquid so as to recover the quaternary ammonium ions in the concentrated liquid as quaternary ammonium alkalies.

However, the both methods basically use expensive reversed osmotic membranes so as to physically concentrate organic quaternary ammonium hydroxides such as TMAH. In view of the durability of the membranes, the pH range for the membranes employable for a long period of time is about 10 or less. However, the pH value of the concentrated liquid rises with the elevation of the concentration of organic quaternary ammonium hydroxides in the liquid. For instance, a TMAH-containing liquid is, even though it is much concentrated, to have a pH of 12 when the content of TMAH therein is 0.02 mol/liter (0.2% by weight). Therefore, the methods are problematic in that they cannot concentrate the waste liquid to a high concentration. In order to overcome the problem, the methods may include neutralization of the waste liquid prior to the reversed osmotic permeation thereof. However, the neutralization involves another problem in that the cost of the neutralizing agent to be used is high. In addition, the concentrating capacity of the reversed osmotic permeation is low or, namely, the concentration of the liquid waste to be elevated by one-pass permeation of the method is at most four times as large as that of the non-concentrated one. Therefore, a plurality of operations for the reversed osmotic permeation are needed so as to concentrate the liquid waste to a desired concentration. In addition, if the concentration of the liquid waste to be concentrated by the permeation is not constant, there occurs still another problem in that a concentrated liquid having a constant concentration cannot be obtained. In general, since the concentration of TMAH or the like to be contained in the liquid waste of the kind individually varies, there is still another problem in that the reversed osmotic permeation method needs adjustment of the concentration of TMAH or the like and variation of the operating conditions for the individual cases. Moreover, also the resist peelings to be contained in the waste liquid are concentrated along with the concentration of the organic quaternary ammonium hydroxides and the concentrated resist peelings adhere to the reversed osmotic membrane. Probably due to the adhesion, there occurs still another problem in that the capacity and durability of the reversed osmotic membrane being used are lowered so that the life of the membrane is short. At present, there is not known a reversed osmotic membrane which may completely remove solutes, and leakage of a small amount of organic quaternary ammonium hydroxides from the processed water through the currently-used membrane is inevitable. Therefore, there is still another problem in that the concentrating capacity of the membrane is lowered when the removing capacity thereof is elevated. Thus, the methods of using the reversed osmotic membrane were problematic in that they need high processing costs and they cannot always give satisfactory results.

In addition, various methods have heretofore been proposed for recovering useful substances such as TMAH and choline from the waste liquids or for regenerating a developer from them.

For instance, Japanese Patent Laid-Open No. 60-247641 has proposed a method of concentrating a waste liquid containing organic quaternary ammonium ions derived from TMAH and others by reversed osmotic permeation followed by electrolyzing the resulting concentrated liquid so as to recover the organic quaternary ammonium ions from the concentrated liquid as organic quaternary ammonium alkalies. Japanese Patent Laid-Open No. 58-30753 has proposed a method of removing photo-resists from a waste liquid by adsorption using an active charcoal column and a filtration column, followed by adding a fresh developer to the resulting filtrate for its pH adjustment to recover the developer from the filtrate.

However, the former method needs an expensive reversed osmotic membrane so as to physically concentrate the organic quaternary ammonium hydroxides such as TMAH to a determined concentration. In view of the durability of the membrane to be used in the method, the pH range applicable to the membrane for a long period of time is substantially 10 or less. Therefore, if the pH value of the liquid waste to be processed by the method is too high, the durability of the reversed osmotic membrane to be used in the method is lowered. Thus, the waste liquid processable by the method is limitative. In addition, the concentrating capacity of the reversed osmotic permeation is low or, namely, the concentration of the liquid waste to be elevated by one-pass permeation of the method is at most four times as large as that of the non-concentrated one. Therefore, a plurality of operations for the reversed osmotic permeation are needed so as to concentrate the liquid waste to the desired concentration for the next electrolyzing step or to a concentration of from 1 to 2% or so. In general, the permeation is conducted while the concentrating capacity of the membrane is set constant. However, if the concentration of the liquid waste to be concentrated by the permeation is not constant, there occurs a problem in that the concentration of the concentrated liquid is not also constant so that the concentrated liquid cannot be used in the next electrolyzing step. Further, since the leakage of a part of the concentrated ions into the filtrate is inevitable, the secondary treatment of the filtrate is inevitable prior to discharging it and the percentage of the recovery of the valuable substances is also lowered.

In addition, since the resist peelings and surfactants as contained in the waste liquid are also concentrated along with the organic quaternary ammonium hydroxides and they adhere to the reversed osmotic membrane being used. Probably due to the adhesion, there occurs still another problem in that the capacity and durability of the reversed osmotic membrane being used are lowered so that the capacity thereof of recovering organic quaternary ammonium hydroxides is lowered an the life thereof is short. Thus, the method of reversed osmotic permeation was problematic in that it needs high processing costs and it cannot always give satisfactory results.

The latter method is also problematic in that it needs a large amount of active charcoal since the adsorbing capacity of active charcoal is small. Since active charcoal to be used in the method is expensive, discarding of the used active charcoal is uneconomical. However, even if re-use of the used active charcoal is desired, the cost for regeneration of the used active charcoal is high.. Moreover, contamination of the filtrate with impurities such as metal ions or fine particles from active charcoal being used is inevitable. Thus, the method cannot be said to be suitable for recovering high-purity organic quaternary ammonium hydroxides.

OBJECT AND SUMMARY OF THE INVENTION

We the present inventors assiduously studied in order to establish a method of processing an organic quaternary ammonium hydroxide-containing waste liquid where a waste liquid containing at least an organic quaternary ammonium hydroxide is efficiently and inexpensively processed to give a low-COD, clean processed water which may be safely discharged to rivers and others and, as a result, have found that when a waste liquid containing at least an organic quaternary ammonium hydroxide is brought into contact with a cation-exchanging material, organic quaternary ammonium ions may be selectively and efficiently adsorbed by the cation-exchanging material thus the organic quaternary ammonium hydroxide is efficiently separated and removed from the waste liquid or is recovered as a valuable substance. We also have found that even when the waste liquid contains resist peelings, the peelings have no bad influence on the adsorption of the organic quaternary ammonium hydroxide to the cation-exchanging material. On the basis of the findings, we have completed the present invention.

Therefore, one object of the present invention is to provide a method of processing an organic quaternary ammonium hydroxide-containing waste liquid where a waste liquid containing at least an organic quaternary ammonium hydroxide is efficiently and inexpensively processed to obtain a low-COD, clean processed water which may be discharged to rivers and others safely.

Another object of the present invention is to provide a method of processing an organic quaternary ammonium hydroxide-containing waste liquid where a waste liquid containing at least an organic quaternary ammonium hydroxide and resist peelings is efficiently and inexpensively processed to obtain a low-COD, clean processed water which may be discharged to rivers and others safely.

Still another object of the present invention is to provide a method of processing an organic quaternary ammonium hydroxide-containing waste liquid where a valuable substance of an organic quaternary ammonium hydroxide having a relatively high purity is efficiently and inexpensively recovered from a waste liquid containing at least an organic quaternary ammonium hydroxide.

Still another object of the present invention is to provide a method of processing an organic quaternary ammonium hydroxide-containing waste liquid for recovering an organic quaternary ammonium hydroxide from the waste liquid, where an organic quaternary ammonium hydroxide is efficiently recovered from a waste liquid containing at least an organic quaternary ammonium hydroxide while the processed water from which the organic quaternary ammonium hydroxide has been separated and removed may be a low-COD, clean processed water.

Still another object of the present invention is to provide a method of processing an organic quaternary ammonium hydroxide-containing waste liquid where a waste liquid containing at least an organic quaternary ammonium hydroxide and resist peelings is brought into contact with a cation-exchanging material in order that only the organic quaternary ammonium ions are selectively and efficiently adsorbed by the cation-exchanging material and that the ions are easily and surely separated from the material to efficiently and inexpensively recover a valuable substance of the organic quaternary ammonium hydroxide having a relatively high purity.

Specifically, the present invention is a method of processing an organic quaternary ammonium hydroxide-containing waste liquid where a waste liquid containing at least an organic quaternary ammonium hydroxide is brought into contact with a cation-exchanging material so as to remove the organic quaternary ammonium ions from the waste liquid due to adsorption of them to the cation-exchanging material.

The present invention is also a method of processing an organic quaternary ammonium hydroxide-containing waste liquid where the cation-exchanged water to be obtained by the contact of the waste liquid with a cation-exchanging material is treated with an acid to have pH of 7 or less and resist peelings are separated and removed from the processed water.

In addition, the present invention is also a method of processing an organic quaternary ammonium hydroxide-containing waste liquid for recovering an organic quaternary ammonium hydroxide from a waste liquid containing at least the organic quaternary ammonium hydroxide, the method comprising an adsorbing step of bringing the waste liquid into contact with a cation-exchanging material so as to make the organic quaternary ammonium ions in the waste liquid adsorbed by the cation-exchanging material, an eluting step of bringing an eluent into contact with the cation-exchanging material which has adsorbed the organic quaternary ammonium ions so as to elute the organic quaternary ammonium ions from the material, and an electrolyzing-step of electrolyzing the eluate obtained in the eluting step so as to recover an aqueous solution of the organic quaternary ammonium hydroxide.

The present invention is also a method of processing an organic quaternary ammonium hydroxide-containing waste liquid for recovering an organic quaternary ammonium hydroxide from the waste liquid, in which the eluate is electrolyzed in an electrolytic cell having a cation-exchanging membrane as the partition membrane in the above-mentioned electrolyzing step and the anodic liquid as drawn from the electrolytic cell is circulated to the eluting step to be used therein as an eluent for the organic quaternary ammonium ions as adsorbed by the cation-exchanging material.

The waste liquid to be processed in accordance with the methods of the present invention essentially contains an organic quaternary ammonium hydroxide as a COD-causing substance. The waste liquid may additionally contain, if it is derived from a developer or washing liquid containing an organic quaternary ammonium hydroxide, resist peelings and other additives such as various surfactants and a small amount of other COD-causing substances such as alcohols and ethers which are in the developer or washing liquid. These other COD-causing substances are not chemically adsorbed by a cation-exchanging material but pass through it, provided that they are not in the waste liquid as cations. Therefore, they do not cause a bar to the adsorption of organic quaternary ammonium hydroxides to the cation-exchanging material. However, if the amount of such other COD-causing substances in the waste liquid to be processed by the present invention is large, the cation-exchanged water to be obtained after the contact of the waste liquid with the cation-exchanging material is to have a high COD value. In the case, therefore, an additional treatment for removing such other COD-causing substances such as an activated sludge process is necessary.

The waste liquid may be a primary-processed waste liquid to be obtained by previously removing resist peelings and other COD-causing substances not existing as cations therefrom as much as possible, for example, by using active charcoal or the like. In the case, the primary-processed waste liquid may be brought into direct contact with a cation-exchanging material to give a clean processed water which may well be discharged to rivers and others.

A typical waste liquid to be drained from the developing step in manufacturing semiconductor devices will be explained hereunder as one example. In the developing step, in general, an automatic wafer-to-wafer developing is employed. In the machine, the developing step of using a developer and the next rinsing step of rinsing the developed substrates with a pure water are conducted in the same cup. Therefore, in the rinsing step, a pure water in an amount of from five to ten times the amount of the developer is used so that the developer used in the developing step is generally diluted to be a 1/5 to 1/10 waste liquid. Accordingly, the composition of the waste liquid to be drained from the developing step has a content of an organic quaternary ammonium hydroxide of from 500 to 5,000 ppm or so, that of resist peelings of from 10 to 100 ppm or so and that of surfactants of from 0 to several tens ppm or so. Where the organic quaternary ammonium hydroxide is tetramethylammonium hydroxide (TMAH), its concentration in the developer is generally 2.3% by weight or so, so that the TMAH concentration in the waste liquid from the developing step is generally 0.23% by weight or so.

In the present invention, such a waste liquid is first brought into contact with a cation-exchanging material so as to make the organic quaternary ammonium ions in the waste liquid adsorbed by the cation-exchanging material (adsorbing step).

The cation-exchanging material to be used in the present invention may be anyone which may efficiently adsorb organic quaternary ammonium ions derived from organic quaternary ammonium hydroxides, and it may be either a weakly acidic cation-exchanging material or a strongly acidic cation-exchanging material. The base of the ion-exchanging material may be either an organic ion-exchanging material such as an ion-exchanging resin or the like or an inorganic ion-exchanging material such as zeolite, silica gel or the like. Regarding the shape of the material, it may be anyone of powdery, granular, filmy or fibrous materials. Plural cation-exchanging materials may suitably be combined, for example, as a combination of a weakly acidic cation-exchanging material and a strongly acidic cation-exchanging material, a combination of an inorganic ion-exchanging material and an organic ion-exchanging material, a combination of plural cation-exchanging materials each having a different shape, etc., in consideration of the kind and property of the waste liquid to be processed therewith or of the way of discharging the processed water into rivers and others after the processing of it with the cation-exchanging materials. In view of the handlability, economical aspect and ion-exchanging capacity of these cation-exchanging materials, preferred are granular weakly-acidic cation-exchanging resins and/or strongly-acidic cation-exchanging resins.

The choice of either the weakly acidic cation-exchanging material or the strongly acidic cation-exchanging material for use in the present invention may be made in consideration of the advantages and disadvantages of the weakly acidic cation-exchanging material and the strongly acidic cation-exchanging material, which will be mentioned hereunder, and/or in consideration of how to successively process, after organic quaternary ammonium ions have been adsorbed by the cation-exchanging material, the cation-exchanging material that has adsorbed the organic quaternary ammonium ions as well as the cation-exchanged water that has passed through the cation-exchanging material, and/or in consideration of, in the case of recovering the separated organic quaternary ammonium hydroxide, the object of the re-use of the recovered organic quaternary ammonium hydroxide, as well as the method of processing the cation-exchanged water that has passed through the adsorbing step and the process of the subsequent eluting and electrolyzing steps. Advantages and disadvantages of weakly acidic cation-exchanging material and strongly acidic cation-exchanging material:

(1) The operable pH range is from 4 to 14 for the weakly acidic cation-exchanging material and is from 0 to 14 for the strongly acidic cation-exchanging material.
(2) The strongly acidic cation-exchanging material has a higher capacity of adsorbing organic quaternary ammonium ions than the weakly acidic cation-exchanging material.
(3) The strongly acidic cation-exchanging material has a capacity of decomposing neutral salts, but the weakly acidic cation-exchanging material does not have the same.
(4) Regarding the elution of the adsorbed organic quaternary ammonium ions, not only strong acids but also relatively weak acids such as carbonic acid, acetic acid or the like may be applied to the weakly acidic cation-exchanging material as an eluent for easily eluting the adsorbed ions therefrom, and the elution may be conducted with a relatively small amount of the acid. As opposed to this, the elution from the strongly acidic cation-exchanging material is not easy even when strong acids are used as an eluent. In order to elevate the yield of the elution from the strongly acidic cation-exchanging material, therefore, it is necessary to use a large excess amount of a strong acid which is more than 10 times the amount of the organic quaternary ammonium ions to be eluted therewith.
(5) In general, the weakly acidic cation-exchanging material has a larger ion-exchanging capacity than the strongly acidic cation-exchanging material.
(6) When the eluted and recovered aqueous organic quaternary ammonium salt solution is electrolyzed to further recover the resulting organic quaternary ammonium hydroxide, the concentration of the free acid formed during the electrolysis becomes high in the latter stage of the electrolyzing step. If strong acids are used as an eluent in the eluting step, therefore, they often cause a problem of corroding the electrolytic membranes or electrodes used.

In view of the above-mentioned advantages and disadvantages, for example, when organic quaternary ammonium ions are eluted from the cation-exchanging material that has adsorbed the ions and the cation-exchanging material is used repeatedly or when the eluted aqueous organic quaternary ammonium salt solution is electrolyzed to recover the organic quaternary ammonium hydroxide therefrom, it is preferred to use the weakly acidic cation-exchanging material. On the other hand, when organic quaternary ammonium salts are adsorbed by the cation-exchanging material or when the adsorbing capacity of the cation-exchanging material is important since the adsorption and elution must be finished in a short period of time, it is preferred to use the strongly acidic cation-exchanging material.

As examples of the cation-exchanging material for use in the present invention, mentioned are gelled or porously-shaped cation-exchanging resins to be produced by introducing sulfonic acid groups or carboxylic acid groups into a polymer or copolymer base of, for example, styrenic polymers or copolymers such as polystyrene and the like, acrylic polymers or copolymers such as polyacrylic resins and the like, methacrylic polymers or copolymers such as polymethacrylic resins and the like and tetrafluoroethylenic polymers or copolymers such as polytetrafluoroethylene and the like, or into a modified polymer or copolymer base to be prepared by modifying the polymers or copolymers with a crosslinking agent such as divinylbenzene or the like; and also mentioned are inorganic cation-exchanging materials such as zeolite, silica gel and the like.

For the cation-exchanging treatment to be conducted by the contact of the waste liquid with the cation-exchanging material, any known method may be employed in accordance with the kind and shape of the cation-exchanging material to be used. For instance, employable are a column system where a waste liquid is continuously passed through a column filled with a cation-exchanging material, and a batch system where a cation-exchanging material is added to a liquid waste so that the latter is brought into contact with the former by stirring them and thereafter the blend is filtered for solid-liquid separation.

The cation-exchanged water to be obtained by the contact of the waste liquid with the cation-exchanging material no more contains organic quaternary ammonium ions since the ions have been adsorbed by the cation-exchanging material.

A waste liquid derived from a developer or the like contains resist peelings. However, the existence of the resist peelings in the waste liquid is not a bar to the adsorption of organic quaternary ammonium ions by the cation-exchanging material, but almost all the resist peelings are not adsorbed by the cation-exchanging material but pass through it so that they remain in the cation-exchanged water. A waste liquid derived from a washing liquid contains surfactants. When it is brought into contact with the cation-exchanging material, a part of the surfactants are adsorbed by the cation-exchanging material in the early stage of its contact with the material. However, the existence of surfactants in the waste liquid is not a bar to the adsorption of organic quaternary ammonium ions by the cation-exchanging material. Similarly, even when the waste liquid to be processed by the present invention contains a small amount of alcohols and ethers, such alcohols and ethers are not adsorbed by the cation-exchanging material but pass through it so that they remain in the cation-exchanged water. Thus, the existence of such a small amount of alcohols and ethers in the waste liquid is not also a bar to the adsorption of organic quaternary ammonium ions by the cation-exchanging material.

Accordingly, the next step of processing the cation-exchanged water to be obtained by the contact of a waste liquid with the cation-exchanging material is determined, considering how and what COD-causing substances are contained in the cation-exchanged water. For instance, the cation-exchanged water from the waste liquid discharged from the developing step and the rinsing step in production of semiconductor devices and liquid crystal devices essentially contains resist peeling, in general. The cation-exchanged water is treated with active charcoal so as to remove the resist peelings therefrom, or it is adjusted with an acid to have pH of 7 or less so as to remove the resulting precipitates of the resist peelings therefrom. If the cation-exchanged water contains surfactants, the surfactants are co-precipitated along with the resist peelings so as to remove them as much as possible from the water.

The acid to be used for the pH adjustment of the cation-exchanged water for removing the precipitates of the resist peelings and surfactants from the water is not specifically defined, but in general, inorganic acids such as hydrochloric acid, nitric acid, sulfuric acid and the like, as well as carbon dioxide and also organic acids such as acetic acid, formic acid and the like are used. In view of the economical aspect, the handlability and the absence of the influence on the COD value, preferred are inorganic acids such as hydrochloric acid, nitric acid, sulfuric acid and the like.

Regarding the pH value of the cation-exchanged water to be adjusted by the pH adjustment, since the standard value as stipulated by the national rule of "Environmental Standards Relating to Preservation of Life Environment" falls within pH of from 6.5 to 8.5, it is preferred that the cation-exchanged water is adjusted to have a pH value satisfying the defined range so that it may be discharged to rivers and others after having been filtered.

The resist peelings as precipitated by the pH adjustment may easily be separated from the liquid by filtration.

Since the processed water to be obtained after the removal of the resist peelings and surfactants from the cation-exchanged water by the above-mentioned pH adjustment generally has a COD value that has been sufficiently lowered to the degree suitable for its direct discharging to rivers and others, it may well be discharged thereto. However, if the processed water still contains COD-causing substances such as alcohols, ethers and others, which could not be separated and removed even by the above-mentioned active charcoal treatment and/or pH adjustment but have passed through the processing steps to the water, to the unallowable degree, it is optionally subjected to activated sludge treatment with microorganisms, if necessary, prior to its discharging to rivers and others.

To the activated sludge treatment of the processed water, any known method for the treatment may directly be applied. Since organic alkalies such as organic quaternary ammonium hydroxides and others as well as resist peelings and surfactants have been separated and removed as much as possible from the processed water, the load to the activated sludge treatment of the processed water is generally extremely small and the water may be changed to a clean water easily.

The resist peelings and surfactants as removed and recovered by the pH adjustment may be fired or discarded as industrial wastes.

The cation-exchanging material as used in the above-mentioned cation-exchanging treatment is generally processed with an eluent comprising an aqueous acid solution whereby the organic quaternary ammonium ions and others as adsorbed by the cation-exchanging material are eluted and removed therefrom, and the thus regenerated cation-exchanging material is again used in the above-mentioned cation-exchanging treatment.

The organic quaternary ammonium ions as adsorbed by the cation-exchanging material by the cation-exchanging treatment in the above-mentioned adsorbing step are, if necessary, eluted out of the cation-exchanging material with a suitable eluent of, for example, aqueous solutions of various acids and/or salts or water, to the eluate.

The selection of either aqueous solutions of acids and/or salts or water to be used in the eluting step as the eluent is suitably determined in accordance with the kind of the cation-exchanging material used and in relation to the next electrolyzing step. Where an aqueous acid solution is used as the eluent, in general, the acid may be selected from inorganic acids such as hydrochloric acid, nitric acid, sulfuric acid, carbonic acid and the like and organic acids such as acetic acid, formic acid and the like. Where an aqueous salt solution is used, the salt is suitably selected from carbonates, bicarbonates, sulfates and the like. The base for forming the salt is the same organic quaternary ammonium base as that to be eluted by the elution. The concentration of the eluent may vary broadly, and it may be selected from a broad range of from 0.01 to 20%. When water is used as the eluent, a pure water is preferred as it does not cause introduction of impurities into the eluting step. Of the above-mentioned eluents, preferred are non-electrolytic acids which do not generate any harmful gas in the anodic chamber during electrolysis in the next electrolyzing step and which are not consumed but may be used repeatedly. In particular, more preferred is carbonic acid or a diluted sulfuric acid having a concentration of from 0.05 or 2.0% or so, for the purpose of recovering high-purity organic quaternary ammonium hydroxides.

The electrolyzing step of electrolyzing the eluate as obtained in the eluting step to recover an aqueous quaternary ammonium hydroxide solution is not specifically defined, but for the purpose of recovering an aqueous organic quaternary ammonium hydroxide solution having a high purity, the method described in Japanese Patent Publication No. 63-15355 is preferably employed for the step.

The method uses an electrolytic cell having a cation-exchanging membrane as the partition membrane and is such that an eluate is circulated in the anode chamber for a period of a determined residence time while an aqueous organic quaternary ammonium hydroxide solution having a low concentration is circulated in the cathode chamber, and the organic quaternary ammonium ions to be generated in the anode chamber when an electric current is applied between the anode and the cathode are selectively moved to the cathode chamber whereby the concentration of the organic quaternary ammonium hydroxide in the cathode chamber is elevated and the aqueous organic quaternary ammonium hydroxide solution thus having a high concentration is recovered from the cathode chamber.

In the present invention, it is preferred that the anodic liquid as drawn from the anode chamber in the electrolyzing step of electrolyzing the eluate is re-circulated and re-used as the eluent in the previous step of eluting the organic quaternary ammonium ions from the cation-exchanging material that has adsorbed the ions. By the combined elution and electrolysis in this way, organic quaternary ammonium hydroxides are conveniently recovered. Accordingly, any of aqueous solutions of acids and/or salts and water may be used as the eluent, and the anodic liquid as drawn from the anode chamber in the electrolytic cell in the electrolyzing step may be re-circulated and re-used as the eluent in the previous eluting step while the organic quaternary ammonium hydroxide in the eluate obtained in the eluting step is moved to the cathode chamber in the electrolytic cell in the electrolyzing step. Therefore, the elution of organic quaternary ammonium ions from the cation-exchanging material that has adsorbed the ions may be conducted, using a small amount of the eluent.

Where an aqueous acid solution is first used as the eluent, in general, the eluate contains salts to be formed from the acid and acid radical and the organic quaternary ammonium ions as eluted from the cation-exchanging material that has adsorbed the ions. When the eluate is electrolyzed, a part of the salts are decomposed so that the organic quaternary ammonium ions are moved to the cathode chamber to be an organic quaternary ammonium hydroxide, while an acid of an amount corresponding to the amount of the hydroxide is formed in the anode chamber.

Accordingly, since the acid concentration of the anodic liquid becomes higher than that of the original eluate while the organic quaternary ammonium ion concentration of the same is lowered, the anodic liquid may be re-circulated to the eluting step as the eluent and it may be used for eluting the organic quaternary ammonium ions from the cation-exchanging material that has adsorbed the ions. By repeating the recirculating operation, the elution of the organic quaternary ammonium ions in the eluting step may be conducted while the organic quaternary ammonium ions are recovered in the electrolyzing step. Accordingly, an aqueous acid solution having a low concentration may be used as an eluent in the eluting step, whereby the problem of the corrosion of the electrolytic membrane and electrodes being used in the electrolytic cell may be reduced and, additionally, introduction of the liberated free acid radicals into the recovered aqueous organic quaternary ammonium hydroxide solution through the electrolytic membrane as impurities may be prevented as much as possible with the result that an organic quaternary ammonium hydroxide solution having a high purity may be obtained.

Even when an aqueous salt solution or an aqueous solution containing an acid and a salt is first used as the eluent, the salt in the eluate may be decomposed in the electrolyzing step so that, like the above-mentioned case using an aqueous acid solution as the eluent, an organic quaternary ammonium hydroxide is formed in the cathode chamber while an acid is in the anode chamber. Accordingly, the anodic liquid as drawn from the anode chamber in the electrolyzing step may be re-circulated to the eluting step as the eluent and it may be used for eluting the organic quaternary ammonium ions from the cation-exchanging material that has adsorbed the ions in the eluting step. By repeating the operation, the elution of the organic quaternary ammonium ions in the eluting step may be conducted while the organic quaternary ammonium hydroxide is recovered in the electrolyzing step.

The salt to be used herein is suitably selected from carbonates, bicarbonates, sulfates and the like. As the base for forming the salt, most preferred is the same organic quaternary ammonium base as that to be eluted.

Where water is used as the eluent, the cation-exchanging material to be used is limited to be only a weakly acidic cation-exchanging material. Although the elution speed of the eluent of water is lower than that of the eluent of an aqueous acid solution or aqueous salt solution, the eluent of water is free from the problem of corroding the electrolytic membrane and electrodes used and, therefore, it is suitable for recovery of a high-purity, aqueous organic quaternary ammonium hydroxide solution.

In accordance with the methods of the present invention of processing a waste liquid containing at least an organic quaternary ammonium hydroxide, since the waste liquid is brought into contact with a cation-exchanging material so that the organic quaternary ammonium ions are surely adsorbed by the cation-exchanging material, the organic quaternary ammonium hydroxide may efficiently and surely be separated and removed from the waste liquid irrespective of the concentration of the organic quaternary ammonium hydroxide in the waste liquid.

Moreover, even though the waste liquid additionally contains resist peelings of high molecular substances and others, the resist peelings and others do not adhere to the cation-exchanging material during the cation-exchanging treatment to deteriorate the capacity of the cation-exchanging material whilst the organic quaternary ammonium hydroxide may efficiently and surely be separated and removed from the waste liquid. Even when a small amount of the cation-exchanging material is used, a large amount of the waste liquid may be processed by the methods of the present invention.

The resist peelings and surfactants which have passed through the cation-exchanging material to remain in the cation-exchanged water may easily be separated and removed from the water by adding an acid to the water so as to adjust the pH of the water at 7 or less. The pH adjustment may extremely easily be conducted since the alkaline organic quaternary ammonium ions have been adsorbed by the cation-exchanging material due to the cation-exchanging treatment.

Accordingly, even a waste liquid containing organic quaternary ammonium hydroxides, which could hardly be processed by a conventional activated sludge process, may efficiently and inexpensively be processed by the methods of the present invention to give a low-COD clean water.

For recovering the organic quaternary ammonium ions as adsorbed by the cation-exchanging material or, for example, for recovering the organic quaternary ammonium hydroxide of a valuable substance from a waste liquid containing an organic quaternary ammonium hydroxide and resist peelings, in accordance with the methods of the present invention, the waste liquid is brought into contact with a cation-exchanging material so that the organic quaternary ammonium ions are selectively adsorbed by the cation-exchanging material, then the organic quaternary ammonium ions as adsorbed by the cation-exchanging material are eluted, and the resulting eluate is electrolyzed to thereby recover the organic quaternary ammonium hydroxide. Therefore, introduction of the resist peelings of high molecular substances and others into the recovered aqueous organic quaternary ammonium hydroxide solution may be prevented as much as possible and, additionally, the resist peelings of high molecular substances and others do not adhere to the cation-exchanging material to lower the capacity of the material. Thus, the organic quaternary ammonium hydroxide of a valuable substance may be recovered efficiently and inexpensively with a high purity by the methods of the present invention.

DETAILED DESCRIPTION OF THE PREFERRED EMBODIMENTS

The present invention will be explained in more detail with reference to the examples mentioned below.

A waste liquid (pH: 12, TMAH: 2,000 ppm, resist peelings: 38 ppm, nonionic surfactant: 46.9 dyne/cm) discharged from the developing step in the process of producing semiconductor devices, in which process a photolyzable resist (OFPR8800, trade name of Tokyo Ohka Kogyo KK) was used as the resist and an aqueous TMAH solution of 0.261 mol/liter was used as the developer, was processed in the following examples.

EXAMPLE 1

As the cation-exchanging material, 200 ml of a weakly acidic cation-exchanging resin (C-464, trade name of Sumitomo Chemical Co.) were filled into a column having a length of 300 mm and a diameter of 60 mm to prepare an ion-exchanging resin column.

10 liters of the above-mentioned waste liquid were passed through the ion-exchanging resin column at a flow rate of 30 ml/min for cation-exchanging treatment of the liquid. The cation-exchanged water as obtained by the cation-exchanging treatment was subjected to neutralization titration to determine the TMAH concentration thereof. Using an absorptiometer, the concentration of the resist peelings in the cation-exchanged water was determined. Using a tensiometer, the surface tension of the same was measured to determine the surfactant concentration thereof. The results obtained are shown in Table 1 below.

Next, 10 ml of an aqueous sulfuric acid solution of 0.1 mol/liter were added to 10 liters of the thus-obtained cation-exchanged water whereby the pH of the water was adjusted at 6.5. By the pH adjustment, the resist peelings and surfactant were precipitated, and the precipitates were separated and removed by filtration. Of the processed water thus obtained by the pH adjustment followed by the filtration, the TMAH concentration, the concentration of the resist peelings and the surfactant concentration based on the surface tension were determined. The results obtained are shown in Table 1.

TABLE 1

| Sample (discharged liquid) | TMAH Concentration (ppm) | Concentration of Resist Peelings (ppm) | Surfactant Concentration (dyne/cm) | pH Value |
|---|---|---|---|---|
| Waste Liquid | 2,000 | 38 | 46.9 | 12.0 |
| Cation-exchanged Water | <10 | 38 | 64.3 | 7.0 |
| Processed Water after pH adjustment and Filtration | <10 | <3 | 72.1 | 6.5 |

(Note) Surface tension of pure water: 72.2 dyne/cm

As is obvious from Table 1 above, the processed water as obtained by filtration after the pH adjustment had a COD value of only 5 mg/liter and it was clean to the degree that it may well be discharged to rivers and others without needing any additional activated sludge treatment.

Using 500 ml of an aqueous sulfuric acid solution of 0.31 mol/liter as the eluent, the tetramethylammonium ions (TMA ions) as adsorbed by the cation-exchanging resin in the above-mentioned cation-exchanging treatment were eluted from the cation-exchanging resin to recover 500 ml of an aqueous TMA sulfate solution of 0.218 mol/liter.

500 ml of the aqueous TMA sulfate solution of 0.218 mol/liter thus obtained were then circulated in the anode chamber of an electrolytic cell having a cation-exchanging membrane as the partition membrane, at a flow rate of 100 ml/min, while an aqueous TMAH solution of 0.05 mol/liter was circulated in the cathode chamber at a flow rate of 100 ml/min, whereupon a direct current of about 2 A having a voltage of from 9 to 17 V was applied between the anode and the cathode. In this way, the electrolysis was carried out for about 11 hours to recover 500 ml of an aqueous TMAH solution of 0.355 mol/liter.

The recovery of TMAH to TMAH that had been in the waste liquid was about 75% by weight. The thus recovered aqueous TMAH solution of 0.355 mol/liter had a high purity comparable to the purity of the aqueous TMAH solution used as the developer with respect to the concentration of the impurities in them.

EXAMPLE 2

In place of the weakly acidic cation-exchanging resin as the cation-exchanging material, 500 ml of a strongly acidic cation-exchanging resin (SL-112, trade name of Mitsubishi Kasei Corp.) were filled into a column having a length of 300 mm and a diameter of 80 mm to prepare an ion-exchanging resin column.

50 liters of the above-mentioned waste liquid were passed through the ion-exchanging resin-column at a flow rate of 25 ml/min to conduct the cation-exchanging treatment of the liquid. Of the cation-exchanged water obtained by the cation-exchanging treatment, the TMAH concentration, the concentration of the resist peelings and the surfactant concentration based on the surface tension were determined in the same manner as in Example 1. The results obtained are shown in Table 2 below.

10 ml of an aqueous sulfuric acid solution of 0.1 mol/liter were added to 10 liters of the thus-obtained cation-exchanged water to adjust the pH of the water at 6.5. By the pH adjustment, the resist peelings and the surfactant were precipitated, and the precipitates were separated and removed by filtration. Of the processed water thus obtained by the pH adjustment followed by the filtration, the TMAH concentration, the concentration of the resist peelings and the surfactant concentration based on the surface tension were determined. The results obtained are shown in Table 2.

TABLE 2

| Sample (discharged liquid) | TMAH Concentration (ppm) | Concentration of Resist Peelings (ppm) | Surfactant Concentration (dyne/cm) | pH Value |
|---|---|---|---|---|
| Waste Liquid | 2,000 | 38 | 46.9 | 12.0 |
| Cation-exchanged Water | <10 | 38 | 64.8 | 7.0 |
| Processed Water after pH adjustment and Filtration | <10 | <3 | 72.0 | 6.5 |

(Note) Surface tension of pure water: 72.2 dyne/cm

As is obvious from Table 2 above, the processed water as obtained by filtration after the pH adjustment had a COD value of only 6 mg/liter and it was clean to the degree that it may well be discharged to rivers and others without needing any additional activated sludge treatment.

200 ml of an aqueous sulfuric acid solution of 0.05 mol/liter were applied, as the eluent, to the cation-exchanging resin that had adsorbed tetramethylammonium ions (TMA ions) by the above-mentioned cation-exchanging treatment. The eluate that had passed through the cation-exchanging resin was then circulated in the anode chamber of an electrolytic cell having a cation-exchanging membrane as the partition membrane, at a flow rate of 200 ml/min, while an aqueous TMAH solution of 0.06 mol/liter was circulated in the cathode chamber at a flow rate of 200 ml/min, whereupon a direct current of about 2.5 A having a voltage of from 25 to 50 V was applied between the anode and the cathode. In this way, the electrolysis was carried out along with the elution for about 25 hours to recover 1,100 ml of an aqueous TMAH solution.

The TMAH recovery to TMAH that had been in the waste liquid was about 65% by weight. The concentration of the recovered aqueous TMAH solution was 0.65 mol/liter. The recovered aqueous TMAH solution had a high purity comparable to the purity of the aqueous TMAH solution used as the developer.

EXAMPLE 3

As the cation-exchanging material, 50 ml of a strongly acidic cation-exchanging resin (PK216H, produced by Mitsubishi Kasei Corp.) were filled into a column having a length of 300 mm and a diameter of 20 mm to prepare a cation-exchanging resin column.

16 liters of a waste liquid (TMAH: 500 ppm (0.005 mol/liter), resist peelings: 10 ppm, surfactant: 58.4 dyne/cm) were passed through the cation-exchanging resin column at a flow rate of 20 ml/min whereby the cations in the waste liquid were adsorbed by the cation-exchanging resin.

Next, 150 ml of a sulfuric acid solution of 0.5 mol/liter were passed through the cation-exchanging resin column to elute the cations from the cation-exchanging resin that had adsorbed them. The volume of the eluate thus obtained was 0.15 liters, and 16 liters of the waste liquid were concentrated about 106 times. The TMAH recovery after the treatment was 84.2%. The TMAH ion recovery was obtained by measuring the TMA ion concentration in the TMA sulfate in the eluate by anion-exchanging separation followed by neutralization titration, the TMA ion concentration measured being converted into TMAH.

As is obvious from Example 3, the volume of the waste liquid was reduced to about 1/100 by the treatment or, that is, the thin waste liquid was concentrated to the thick liquid concentrate by the treatment. By the treatment, therefore, the cost for firing the thick liquid concentrate or the cost for discarding it as an industrial waste may be reduced noticeably.

EXAMPLE 4

As the cation-exchanging material, 100 ml of a weakly acidic cation-exchanging resin (C-464, trade name of Sumitomo Chemical Co.) were filled into a column having a length of 300 mm and a diameter of 50 mm to prepare an ion-exchanging resin column.

10 liters of the above-mentioned waste liquid were passed through the ion-exchanging resin column at a flow rate of 20 ml/min so that 20 g of TMAH in the waste liquid were adsorbed by the resin.

Next, 300 ml of an aqueous sulfuric acid solution of 0.015 mol/liter was applied, as the eluent, to the ion-exchanging resin column to elute the tetramethylammonium ions (TMA ions) from the cation-exchanging resin. The resulting eluate was fed into the anode chamber to undergo the electrolysis. The anodic liquid drawn from the anode chamber was returned back to the ion-exchanging resin column and circulated therein at a flow rate of 100 ml/min.

230 ml of an aqueous TMAH solution of 0.029 mol/liter were circulated, as the cathodic liquid, in the cathode chamber at a flow rate of 100 ml/min. A direct current of 2 A having a voltage of from 24 to 52 V was applied between the anode and the cathode to carry out the electrolysis. Thus, the elution and electrolysis were carried out simultaneously for about 10 hours and 320 ml of an aqueous TMAH solution of 0.702 mol/liter were recovered.

The thus-recovered aqueous TMAH solution was colorless and transparent and contained resist peelings in an amount of not more than 3 ppm. The TMAH recovery to TMAH that had been in the waste liquid was about 99%.

The recovered aqueous TMAH solution was diluted to a concentration of 0.261 mol/liter for use as a developer. The concentration of the metal impurities in the diluted solution was determined by graphite-furnace atomic absorption spectrophotometry; and the anion concentration in the same by ion-chromatography. The results obtained are shown in Table 3 below.

EXAMPLE 5

As the cation-exchanging material, 100 ml of a weakly acidic cation-exchanging resin (MWC-1, trade name of Dow Chemical Co.) were filled into a column having a length of 300 mm and a diameter of 50 mm to prepare an ion-exchanging resin column.

16 liters of the above-mentioned waste liquid were passed through the ion-exchanging resin column at a flow rate of 10 ml/min, whereby 31 g of TMAH in the waste liquid were adsorbed by the resin.

Next, a carbonated water that had been prepared by introducing carbon dioxide into 400 ml of a pure water to adjust the pH of the water at 4.8 was applied, as the eluent, to the ion-exchanging resin column whereby the TM ions were eluted from the cation-exchanging resin. The resulting eluate was introduced into the anode chamber to undergo the electrolysis. The anodic liquid drawn from the anode chamber was returned back to the ion-exchanging resin column and circulated therein at a flow rate of 100 ml/min, while carbon dioxide was introduced into the anodic liquid at a flow rate of 50 ml/min.

312 ml of an aqueous TMAH solution of 0.55 mol/liter were circulated, as the cathodic liquid, in the cathode chamber at a flow rate of 100 ml/min. A direct current of from 0.26 to 2.0 A having a voltage of from 22 to 55 V was applied between the anode and the cathode to carry out the electrolysis. Thus, the elution and electrolysis were carried out simultaneously for about 16 hours and 377 ml of an aqueous TMAH solution of 1.262 mol/liter were recovered.

The thus-recovered aqueous TMAH solution was colorless and transparent and contained resist peelings in an amount of not more than 3 ppm. The TMAH recovery to TMAH that had been in the waste liquid was about 89%.

The recovered aqueous TMAH solution was diluted to a concentration of 0.261 mol/liter for use as a developer. The concentration of the metal impurities and the anion concentration in the diluted solution were determined in the same manner as in Example 4. The results obtained are shown in Table 3 below.

EXAMPLE 6

As the cation-exchanging material, 100 ml of a weakly acidic cation-exchanging resin (C-464, trade name of Sumitomo Chemical Co.) were filled into a column having a length of 300 mm and a diameter of 50 mm to prepare an ion-exchanging resin column.

10 liters of the above-mentioned waste liquid were passed through the ion-exchanging resin column at a flow rate of 20 ml/min, whereby 22 g of TMAH in the waste liquid were adsorbed by the resin.

Next, 400 ml of an aqueous 0.14%-acetic acid solution (pH 3.8) were applied, as the eluent, to the ion-exchanging resin column whereby the TM ions were eluted from the cation-exchanging resin. The resulting eluate was introduced into the anode chamber to undergo the electrolysis. The anodic liquid drawn from the anode chamber was returned back to the ion-exchanging resin column and circulated therein at a flow rate of 100 ml/min.

312 ml of an aqueous TMAH solution of 0.54 mol/liter were circulated, as the cathodic liquid, in the cathode chamber at a flow rate of 100 ml/min. A direct current of from 0.3 to 1.1 A having a voltage of 55 V was applied between the anode and the cathode to carry out the electrolysis. Thus, the elution and electrolysis were carried out simultaneously for about 12 hours and 375 ml of an aqueous TMAH solution of 1.052 mol/liter were recovered.

The thus-recovered aqueous TMAH solution was colorless and transparent and contained resist peelings in an amount of not more than 3 ppm. The TMAH recovery to TMAH that had been in the waste liquid was about 94%.

The recovered aqueous TMAH solution was diluted to a concentration of 0.261 mol/liter for use as a developer. The concentration of the metal impurities and the anion concentration in the diluted solution were determined in the same manner as in Example 4. The results obtained are shown in Table 3 below.

EXAMPLE 7

As the cation-exchanging material, 500 ml of a strongly acidic cation-exchanging resin (SK-112, trade name of Mitsubishi Kasei Corp.) were filled into a column having a length of 300 mm and a diameter of 80 mm to prepare an ion-exchanging resin column.

50 liters of the above-mentioned waste liquid were passed through the ion-exchanging resin column at a flow rate of 25 ml/min, whereby 100 g of TMAH in the waste liquid were adsorbed by the resin.

Next, 200 ml of an aqueous sulfuric acid solution of 0.05 mol/liter were applied, as the eluent, to the ion-exchanging resin column whereby the TM ions were eluted from the cation-exchanging resin. The resulting eluate was introduced into the anode chamber to undergo the electrolysis. The anodic liquid drawn from the anode chamber was returned back to the ion-exchanging resin column and circulated therein at a flow rate of 200 ml/min.

800 ml of an aqueous TMAH solution of 0.06 mol/liter were circulated, as the cathodic liquid, in the cathode chamber at a flow rate of 200 ml/min. A direct current of 2.5 A having a voltage of from 25 to 50 V was applied between the anode and the cathode to carry out the electrolysis. Thus, the elution and electrolysis were carried out simultaneously for about 25 hours and 1,100 ml of an aqueous TMAH solution of 0.65 mol/liter were recovered.

The thus-recovered aqueous TMAH solution was colorless and transparent and contained resist peelings in an amount of not more than 3 ppm. The TMAH recovery to TMAH that had been in the waste liquid was about 61%.

The recovered aqueous TMAH solution was diluted to a concentration of 0.261 mol/liter for use as a developer. The concentration of the metal impurities and the anion concentration in the diluted solution were determined in the same manner as in Example 4. The results obtained are shown in Table 3 below.

EXAMPLE 8

As the cation-exchanging material, 50 ml of a weakly acidic cation-exchanging resin (IRC-50, trade name of Organo Co.) were filled into a column having a length of 300 mm and a diameter of 50 mm to prepare an ion-exchanging resin column.

10 liters of the above-mentioned waste liquid were passed through the ion-exchanging resin column at a flow rate of 20 ml/min, whereby 14.6 g of TMAH in the waste liquid were adsorbed by the resin.

Next, 200 ml of a pure water were applied, as the eluent, to the ion-exchanging resin column whereby the TM ions were eluted from the cation-exchanging resin. The resulting eluate was introduced into the anode chamber to undergo the electrolysis. The anodic liquid drawn from the anode chamber was returned back to the ion-exchanging resin column and circulated therein at a flow rate of 100 ml/min.

350 ml of an aqueous TMAH solution of 0.54 mol/liter were circulated, as the cathodic liquid, in the cathode chamber at a flow rate of 50 ml/min. A direct current of from 0.1 to 0.38 A having a voltage of 55 V was applied between the anode and the cathode to carry out the electrolysis. Thus, the elution and electrolysis were carried out simultaneously for about 23 hours and 369 ml of an aqueous TMAH solution of 0.67 mol/liter were recovered.

The thus-recovered aqueous TMAH solution was colorless and transparent and contained resist peelings in an amount of not more than 3 ppm. The TMAH recovery to TMAH that had been in the waste liquid was about 36%.

The recovered aqueous TMAH solution was diluted to a concentration of 0.261 mol/liter for use as a developer. The concentration of the metal impurities and the anion concentration in the diluted solution were determined in the same manner as in Example 4. The results obtained are shown in Table 3 below.

TABLE 3

| | Metal Impurities or Anions | | | | | | | |
|---|---|---|---|---|---|---|---|---|
| | Na | K | Ca | Mg | Fe | Cu | $Cl^-$ | $SO_4^{-2}$ |
| Unit of Concentration | ppb | ppb | ppb | ppb | ppb | ppb | ppm | ppm |
| Developer | 1.2 | <1 | 1.8 | <1 | 2.8 | <1 | <0.1 | <0.5 |
| Example 4 | 6.5 | <1 | 2.4 | <1 | 8.0 | <1 | <0.1 | <0.5 |
| Example 5 | 2.2 | <1 | 4.6 | <1 | 4.5 | <1 | <0.1 | <0.5 |
| Example 6 | 2.5 | <1 | 2.9 | <1 | 3.8 | <1 | <0.1 | <1 |
| Example 7 | 10.0 | <1 | 3.3 | <1 | 7.2 | <1 | <0.1 | <0.5 |
| Example 8 | 3.5 | <1 | 1.4 | <1 | 4.1 | <1 | <0.1 | <0.1 |

As is obvious from the results in Table 3 above, the aqueous TMAH solutions that had been recovered in Examples 1 to 5 all had a high purity comparable to the purity of the aqueous TMAH solution used as the developer.

What is claimed is:

1. A method of processing an organic quaternary ammonium hydroxide-containing waste liquid for recovering an organic quaternary ammonium hydroxide from a waste liquid containing at least the organic quaternary ammonium hydroxide, the method comprising an adsorbing step of bringing the waste liquid into contact with a cation-exchanging material to make the organic quaternary ammonium ions in the waste liquid adsorbed by the cation-exchanging material, an eluting step of bringing an eluent into contact with the cation-exchanging material which has adsorbed the organic quaternary ammonium ions to elute the organic quaternary ammonium ions from the material, and an electrolyzing step of electrolyzing the eluate obtained in the eluting step to recover an aqueous solution of the organic quaternary ammonium hydroxide.

2. The method of processing an organic quaternary ammonium hydroxide-containing waste liquid as claimed in claim 1, in which the eluate is electrolyzed in an electrolytic cell having a cation-exchanging membrane as a partition membrane in the electrolyzing step while the anodic liquid drawn from the electrolytic cell is circulated to the eluting step to be used therein as the eluent for eluting the organic quaternary ammonium ions from the cation-exchanging material that has adsorbed the ions.

3. The method of processing an organic quaternary ammonium hydroxide-containing waste liquid as claimed in claim 1, in which the cation-exchanging material is a weakly acidic cation-exchanging resin.

4. The method of processing an organic quaternary ammonium hydroxide-containing waste liquid as claimed in claim 1, in which the waste liquid contains at least an organic quaternary ammonium hydroxide and resist peelings.

5. The method of processing an organic quaternary ammonium hydroxide-containing waste liquid as claimed in claim 1, in which the eluent is an aqueous solution of an acid and/or a salt or is water.

* * * * *